(12) United States Patent
Godier et al.

(10) Patent No.: US 11,025,864 B2
(45) Date of Patent: Jun. 1, 2021

(54) VIDEO CONFERENCE COMMUNICATION

(71) Applicant: Orange, Paris (FR)

(72) Inventors: Julien Godier, Châtillon (FR);
Alexandre Ferrieux, Châtillon (FR);
Matthias Hamel, Châtillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/766,249

(22) PCT Filed: Nov. 13, 2018

(86) PCT No.: PCT/FR2018/052822
§ 371 (c)(1),
(2) Date: May 21, 2020

(87) PCT Pub. No.: WO2019/102105
PCT Pub. Date: May 31, 2019

(65) Prior Publication Data
US 2021/0037211 A1     Feb. 4, 2021

(30) Foreign Application Priority Data
Nov. 27, 2017  (FR) ...................................... 1761217

(51) Int. Cl.
*H04N 7/15* (2006.01)
*H04N 5/45* (2011.01)
*G10L 25/78* (2013.01)

(52) U.S. Cl.
CPC ............. *H04N 7/155* (2013.01); *G10L 25/78* (2013.01); *H04N 5/45* (2013.01)

(58) Field of Classification Search
CPC ............. H04N 7/15; H04N 5/45; G10L 25/78

USPC .............................................. 348/14.01–14.16
See application file for complete search history.

(56) References Cited

U.S. PATENT DOCUMENTS

| 2005/0099492 | A1  | 5/2005 | Orr |
| 2007/0211141 | A1  | 9/2007 | Christiansen |
| 2012/0182381 | A1* | 7/2012 | Abate ................. H04L 12/1822 348/14.03 |

(Continued)

OTHER PUBLICATIONS

International Search Report and Written Opinion dated Mar. 8, 2019 for Application No. PCT/FR2018/052822.

*Primary Examiner* — Melur Ramakrishnaiah
(74) *Attorney, Agent, or Firm* — Knobbe, Martens, Olson & Bear, LLP (57) ABSTRACT

A method of video conference communication between N terminals of N users is described. The method can be implemented by one of the N terminals, and can include receiving, from a processing device, N audiovisual streams respectively transmitted by the N terminals, N items of voice activity information of the N users, respectively associated with N corresponding user identifiers, each of the N items of information assuming a first or a second value respectively representing the presence or absence of voice activity. The method can also include determining, for at least one of the N users, whether or not the information is at the same value from a certain time. The method can also include requesting, from the device upon determining that the information is at the first value from this time, a stream associated with the user as the main stream to be displayed, receiving, and displaying the main stream.

12 Claims, 7 Drawing Sheets

(56) References Cited

U.S. PATENT DOCUMENTS

2014/0114664 A1 4/2014 Khan et al.
2014/0218464 A1* 8/2014 Hartung ............... H04N 7/15
                                                    348/14.07

* cited by examiner

VIDEO CONFERENCE COMMUNICATION

RELATED APPLICATIONS

This application is the U.S. National Phase of Application No. PCT/FR2018/052822 entitled "VIDEO CONFERENCE COMMUNICATION" and filed Nov. 13, 2018, which claims the benefit of French Patent Application No. 1761217, filed Nov. 27, 2017, each of which is incorporated by reference in its entirety.

FIELD OF THE INVENTION

The general field of the invention is that of telecommunications.

The invention relates more particularly to the implementation of communications by video conference and/or videophone between N terminals, such that N≥2.

PRIOR ART

At present, multipoint video conference communication systems use a video conference management bridge to which N terminals, which are associated respectively with N users invited to a video conference, connect via a communication network.

During the video conference, the video conference management bridge receives, at a current instant, N audio video streams emitted respectively by the N terminals. It implements an analysis of these streams so as to detect which user is the one who is speaking predominantly or who is the most active as regards taking turns to speak. Next, for a given user, the bridge returns to this user's terminal the whole set of audio video streams received, optionally with the exception of the audio video stream which was received from the given user's terminal, in such a way that the audio video stream associated with the user who is speaking predominantly at the current instant is displayed on the screen of the given user's terminal in a manner which distinguishes it from the other streams which are displayed. Thus, the audio video stream associated with the user who is speaking predominantly can be displayed in a larger window than those in which the other streams are displayed or else can be displayed highlighted, at the center of the screen, etc. . . . . Such an operation is implemented by the video conference management bridge for each of the N users.

The detection of the user who is speaking predominantly uses mechanisms for detecting voice activity on the basis of the audio data packets extracted from each audio video stream received by the bridge at the current instant.

A drawback of such a video conference system resides in the fact that the implementation of the voice activity detection is not always sufficiently precise, thereby giving rise to poor-quality display of the audio video stream of the user who is speaking, either because another user begins to speak at the same time at the current instant, or because the user who has been detected as being the one who speaks the most pauses their voice or else coughs while taking their turn to speak, etc. . . . . Thus, on the screen, the display of the audio video stream of the user who speaks the most may exhibit undesired overoscillations or artifacts, which prevent the users from always following the video conference correctly and under good operating conditions.

Finally, the mechanisms for detecting voice activity and for retransmitting the audio video streams to be displayed, taking account of the result of the voice activity detection, are specific to the video conference management bridge, each of the N terminals involved in the video conference implementing audio video stream display in a uniform manner. Thus, it is not possible for a given terminal to individually handle the management of the display of the audio video streams associated with the other users as a function of the result of the voice activity detection.

SUBJECT AND SUMMARY OF THE INVENTION

One of the aims of the invention is therefore to remedy inadequacies/drawbacks of the prior art and/or to afford improvements thereto.

To this effect, a subject of the present invention relates to a method of communication by video conference between N communication terminals, such that N≥2, associated respectively with N users.

Such a method is noteworthy in that it implements the following, at the level of a given communication terminal from among the N terminals, at a current instant:
  receive, from a device for processing N audio video streams emitted respectively by the N terminals, N information items relating respectively to the voice activity of the N users and associated respectively with N identifiers relating to said N corresponding users, each of the N information items taking a first value representative of the presence of voice activity or a second value representative of the absence of voice activity,
  for at least one of the N users, determine whether the received information item has or has not been at the same value since a predetermined instant preceding the current instant,
  only if the received information item has been at the first value since the predetermined instant, request from the processing device, by using the user identifier corresponding to said at least one of the N users, an audio video stream associated with said at least one of the N users, as main audio video stream to be displayed,
  receive the main audio video stream requested,
  display the audio video stream received as main audio video stream.

By virtue of the invention, for any terminal which is communicating by video conference, it is possible to continue to display the audio video stream associated with the user who is speaking, even if the latter has stopped speaking for a few seconds or has for example begun to cough, thus avoiding any phenomenon of overoscillation or artifacts during the display of this audio video stream.

Furthermore, the fact that the information item relating to the voice activity is processed at the level of a communication terminal participating in the video conference, rather than at the level of the video conference management bridge, makes it possible to personalize the content of the request, which is dispatched to the video conference bridge, for display of the audio video streams of each of the N users, as well as the display of the audio video streams received from the bridge. Thus, one terminal will be able for example to request the N audio video streams associated respectively with the N users, while another terminal will be able to request only the audio video stream of the user who is speaking predominantly. At the display level, a terminal will be able for example to choose to display only the user who is speaking predominantly in full screen, while another terminal will be able to choose to display the user who is speaking predominantly, for example in full shot, at the center of the screen, and the N−1 other users at the periphery of the screen, in smaller windows.

According to a particular embodiment, if for at least two first and second users from among the N users, the corresponding voice activity information item received has been at the first value since the predetermined instant, compare the instant from which the information item received for the first user passed from the second value to the first value and the instant from which the information item received for the second user passed from the second value to the first value, request from the processing device, as main audio video stream to be displayed, an audio video stream associated with that of the first and second users for which the information item passed from the second value to the first value at the instant closest to the current instant, by using the corresponding user identifier, receive the main audio video stream requested, display the audio video stream received as main audio video stream.

In an advantageous manner, any terminal is thus able to individually implement a priority management mechanism in order, at the current instant, to precisely select at the current instant the user who is considered to be speaking predominantly, when at least two users are speaking at the same time.

According to a particular embodiment, the communication method furthermore comprises the following:

receive, from the audio video stream processing device, N−1 audio video streams associated respectively with the N−1 remaining users, as N−1 secondary audio video streams to be displayed, display said N−1 secondary audio video streams simultaneously with the main audio video stream.

The invention makes it possible to display on the given communication terminal the main audio video stream requested by the latter, simultaneously with the N−1 other audio video streams associated respectively with the N−1 other users participating in the conference. The N−1 audio video streams are considered to be secondary in the sense that they are displayed in a less visible manner than the main audio video stream requested by the given communication terminal.

According to a particular embodiment, only the main audio video stream is received and displayed by the given communication terminal.

Such an embodiment makes it possible to achieve a non-negligible economy of resources in terms of bandwidth, since a given terminal requests from the video conference bridge only the main audio video stream associated with the user who is speaking predominantly.

According to a particular embodiment, if at a current instant, it is determined that the information item received relating to the voice activity of each of the N users has been at the second value representative of the absence of voice activity, since a predetermined instant preceding the current instant, the main audio video stream displayed at the instant which immediately precedes the current instant continues to be displayed.

By virtue of such an embodiment, no additional message needs to be dispatched by the given communication terminal to the audio video stream processing device, thereby advantageously making it possible to economize on the resources of the communication network, until the next turn of one of the users to speak and until a new message is dispatched by the communication terminal to the stream processing device.

The various aforementioned embodiments or characteristics can be added independently or in combination with one another, to the method of communication by video conference such as defined hereinabove.

The invention also relates to a communication terminal for communicating by video conference with at least one other communication terminal, the two terminals belonging to a set of N communication terminals, such that N≥2, associated respectively with N users.

Such a terminal is noteworthy in that it comprises a processing module which is designed to, at a current instant:

receive, from a device for processing N audio video streams emitted respectively by the N terminals, N information items relating respectively to the voice activity of the N users and associated respectively with N identifiers relating to said N corresponding users, each of the N information items taking a first value representative of the presence of voice activity or a second value representative of the absence of voice activity, for at least one of the N users, determine whether the received information item has or has not been at the same value since a predetermined instant preceding the current instant, only if the received information item has been at the first value since the predetermined instant, request from the processing device, by using the user identifier corresponding to said at least one of the N users, an audio video stream associated with said at least one of the N users, as main audio video stream to be displayed, receive the main audio video stream requested, display the audio video stream received as main audio video stream.

According to a particular embodiment, the processing module implements the following:

if for at least two first and second users from among the N users, the corresponding voice activity information item received has been at the first value since the predetermined instant, compare the instant from which the information item received for the first user passed from the second value to the first value and the instant from which the information item received for the second user passed from the second value to the first value, request from the processing device, as main audio video stream to be displayed, an audio video stream associated with that of the first and second users for which the information item passed from the second value to the first value at the instant closest to the current instant, by using the corresponding user identifier, receive the main audio video stream requested, display the audio video stream received as main audio video stream.

According to a particular embodiment, the processing module implements the following:

receive, from the audio video stream processing device, N−1 audio video streams associated respectively with the N−1 remaining users, as N−1 secondary audio video streams to be displayed, display the N−1 secondary audio video streams simultaneously with the main audio video stream.

According to a particular embodiment, only the main audio video stream is received and displayed.

According to a particular embodiment, if at a current instant, the processing module determines that the information item received relating to the voice activity of each of the N users has been at the second value representative of the absence of voice activity, since a predetermined instant preceding the current instant, the main audio video stream displayed at the instant which immediately precedes the current instant continues to be displayed.

The invention also relates to a computer program for implementing program code instructions for the execution of the steps of the method of communication by video conference according to the invention, when the program is executed in a communication terminal.

Such a program can use any programming language and be in the form of source code, object code, or of code intermediate between source code and object code, such as in a partially compiled form, or in any other desirable form.

The invention also relates to a recording medium readable by a computer on which is recorded a computer program, this program comprising instructions adapted to the implementation of the steps of the method of communication by video conference according to the invention, when the program is executed in a communication terminal such as mentioned hereinabove.

The recording media can be any entity or device capable of storing the program. For example, the medium can comprise a storage means, such as a ROM, for example a CD ROM or a microelectronic circuit ROM, a USB key or else a magnetic recording means, for example a hard disk.

Moreover, the recording medium can be a transmissible medium such as an electrical or optical signal, which can be conveyed via an electrical or optical cable, by radio or by other means. The program according to the invention can be in particular downloaded over a network of Internet type.

Alternatively, the recording medium can be an integrated circuit in which the program is incorporated, the circuit being adapted to execute or to be used in the execution of the aforementioned method of establishing communication.

BRIEF DESCRIPTION OF THE DRAWINGS

Other characteristics and advantages will become apparent on reading several particular embodiments of the invention which are given by way of simple illustrative and nonlimiting examples, and the appended drawings, among which.

DETAILED DESCRIPTION OF A PARTICULAR EMBODIMENT

Figure 1:
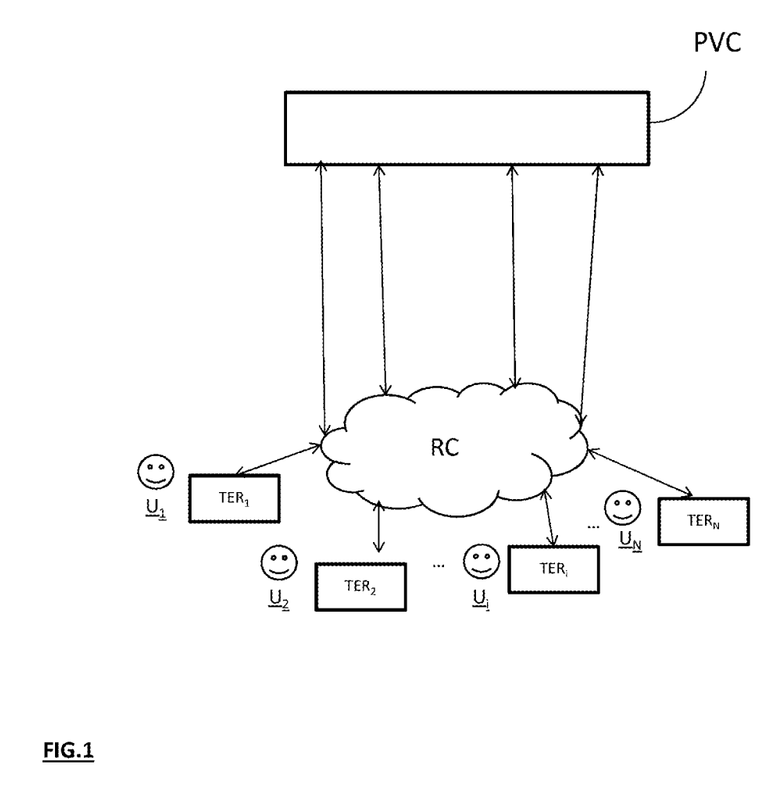
FIG. 1 is a schematic and general view of an architecture in which the method of communication by video conference is implemented in a particular embodiment of the invention.

FIG. 1 represents an environment in which the method of communication by video conference according to the invention is implemented.

For the sake of clarity in FIG. 1, certain well-known elements of this environment are not represented. Such elements are for example servers, nodes, base stations, gateways or else other entities of the telecommunications network which is used in this environment.

In FIG. 1 are represented:
an audio video stream processing device PVC, such as for example a video conference management bridge,
a set of N communication terminals $TER_1$, $TER_2$, ..., $TER_i$, ..., $TER_j$, ..., $TER_k$, ..., $TER_N$, such that $1 \le i \le j \le k \le N$, associated respectively with N users $U_1$, $U_2$, ..., $U_i$, ..., $U_j$, ..., $U_k$, ..., $U_N$ and able to connect to the bridge PVC, via a communication network RC such as for example of IP type (abbreviation of "Internet Protocol").

Each communication terminal comprises a connection interface for connecting to the communication network RC, via for example a local network (not represented), for example wireless, in particular of the WiFi or PLC type (abbreviation of "power-line communication"). As a variant, the connection interface is for example, of x-DSL, fiber or else 3G, 4G, 5G, etc type. An exemplary connection interface is a web browser.

A given communication terminal $TER_i$ is for example non-exhaustively:
a mobile telephone, and/or
a smartphone ("intelligent telephone"), and/or
a tablet, and/or
a laptop computer, and/or
a personal computer of PC type, and/or
a connected television,
etc. . . .

Figure 2:
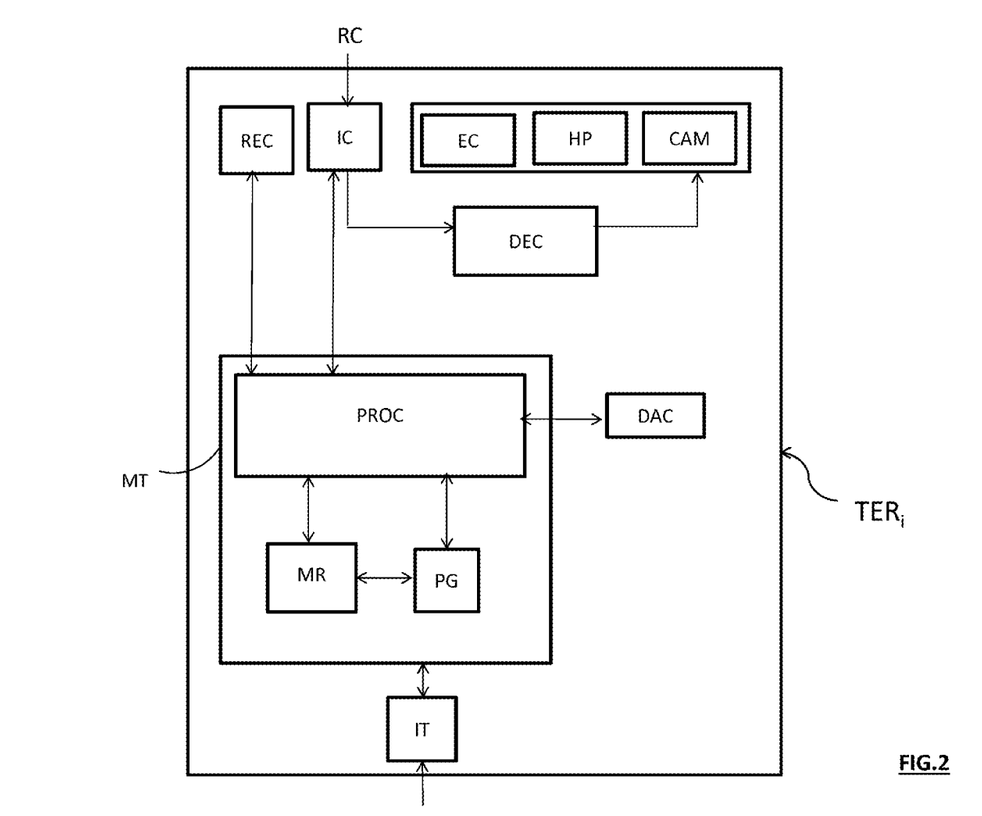
FIG. 2 represents a video conference communication terminal in a particular embodiment of the invention.

The simplified structure of a given communication terminal $TER_i$ according to an exemplary embodiment of the invention is now considered in conjunction with FIG. 2.

In a manner known per se, the communication terminal $TER_i$ comprises:
a connection interface IC which is adapted to communicate, via the communication network RC, according for example to the http protocol (abbreviation of "HyperText Transfer Protocol"), with the video conference management bridge PVC of FIG. 1,
a reception module REC for receiving audio video streams emitted from the video conference management bridge,
an interface IT for processing the user interactions,
a viewing screen EC,
a loudspeaker HP,
a camera CAM,
an interface DEC for audio/video decoding of the contents of text, audio, video or audiovisual type, said interface being adapted to transmit the decoded signals to the screen EC or in the loudspeaker HP.

The communication terminal $TER_i$ comprises physical and/or software resources, in particular a processing module MT for implementing the method of communication by video conference according to the invention, which will be described hereinbelow.

The processing module MT contains a processor PROC driven by a computer program PG.

On initialization, the code instructions of the computer program PG are for example loaded into a RAM memory, denoted MR, before being executed by the processing module MT.

According to the invention, the communication terminal $TER_i$ also comprises a voice activity detection module DAC driven by the processor PROC of the processing module MT.

Let us specify here that the term module used in the present patent application can correspond either to a software component or to a hardware component or a set of hardware components and software components, a software component itself corresponding to one or more computer programs or subprograms or more generally to any element of a program able to implement a function or a set of functions such as are described for the modules concerned. In the same way, a hardware component corresponds to any element of a hardware set (or assembly) able to implement a function or a set of functions for the module concerned (integrated circuit, chip card, memory card, etc.).

Figure 3A:
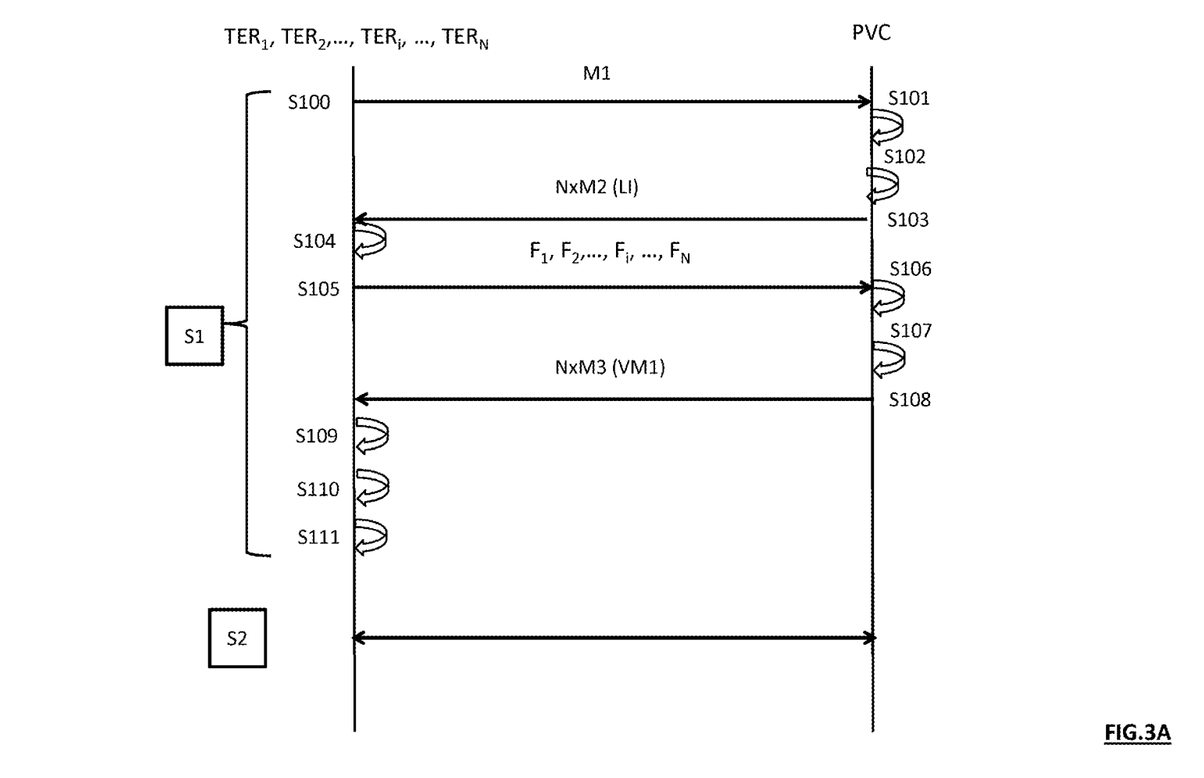
FIGS. 3A to 3C represent the main steps of a method of communication by video conference in a particular embodiment of the invention.
Figure 3B:
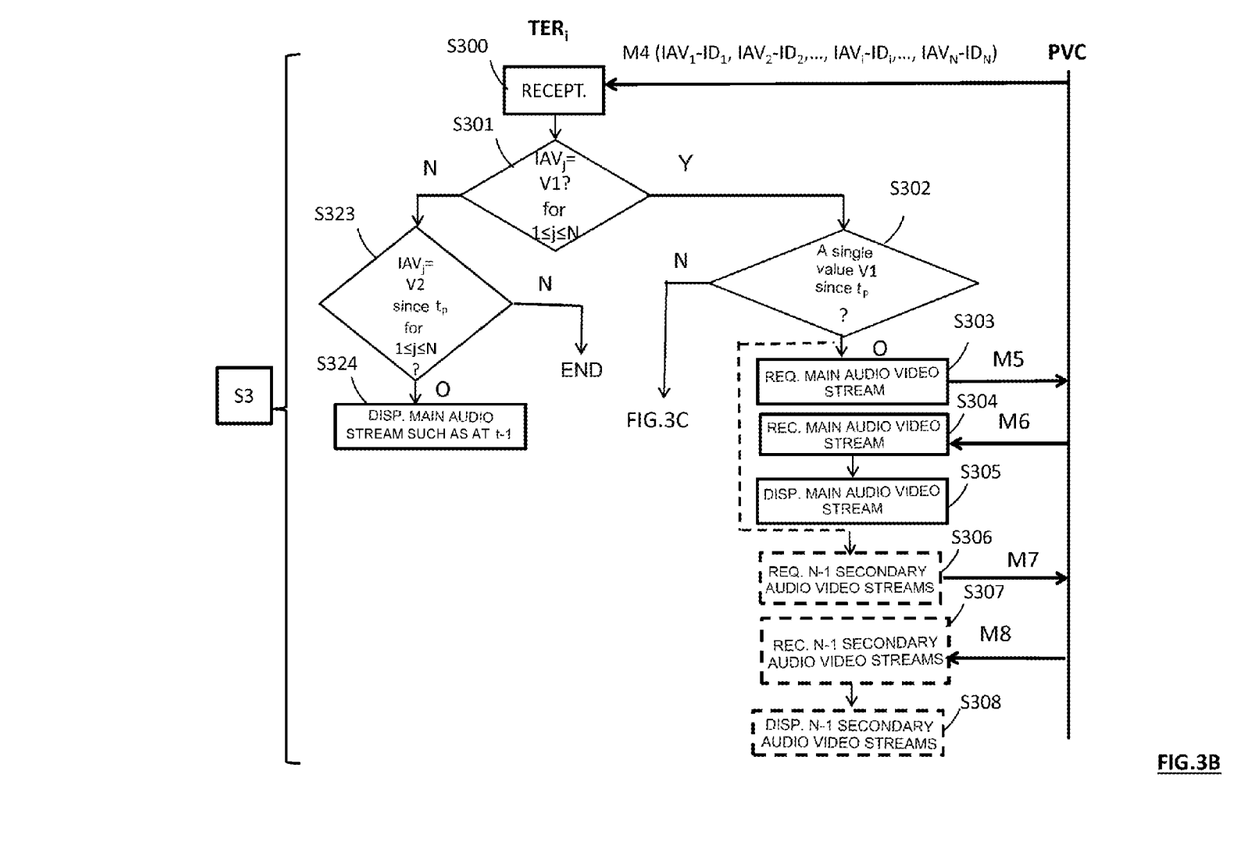

With reference to FIGS. 3A and 3B, the progression of a method of communication by video conference according to the invention is now described, implementing voice activity detection deployed in at least one of the communication terminals $TER_1$, $TER_2$, ..., $TER_i$, ..., $TER_j$, ..., $TER_k$, ..., $TER_N$ of FIG. 1, such as for example the communication terminal $TER_i$ represented in FIG. 2.

The method of communication by video conference firstly implements an initialization S1 of the video conference. To this effect, with reference to FIG. 3A, one of the communication terminals $TER_1$, $TER_2$, ..., $TER_i$, ..., $TER_j$, ..., $TER_k$, ..., $TER_N$ of FIG. 1 dispatches, at S100, to the video conference management bridge PCV, via the network RC, a message M1 requesting creation of a video conference, said message M1 conventionally comprising an identifier associated with the terminal which dispatches the message and an identifier associated with each terminal of a user invited to the video conference.

By way of non-exhaustive examples, such an identifier can be:
- the call identifier MSISDN corresponding in a unique manner to the SIM ("Subscriber Identity Module") card which is provided by the operator of the communication network with which the user of one of the N communication terminals is registered,
- a URI identifier (abbreviation of "Uniform Resource Identifier"),
- an electronic messaging address,
- etc. . . .

Thus, the N terminals $TER_1$, $TER_2$, ..., $TER_i$, ..., $TER_j$, ..., $TER_k$, ..., $TER_N$ are associated respectively with N identifiers $ID_1$, $ID_2$, ..., $ID_i$, ..., $ID_j$, ..., $ID_k$, ..., $ID_N$ of the aforementioned type. It is for example assumed that the N communication terminals participate in the video conference requested by the requesting terminal.

At S101, the video conference management bridge PVC receives the message M1.

At S102, the video conference management bridge PVC extracts the identifiers $ID_1$, $ID_2$, ..., $ID_i$, ..., $ID_N$ from the message M1.

At S103, the video conference management bridge PVC dispatches a message M2 of invitation to the video conference proposed by the requesting communication terminal to each communication terminal associated with a corresponding identifier extracted at S102. The message M2 contains an Internet link (LI) to the video conference to be established.

At S104, each of the N terminals receives the message M2.

At S105, each of the N terminals connects to the video conference bridge PVC with the aid of the Internet link contained in the message M2. To this effect, the N terminals dispatch respectively, destined for the video conference management bridge PCV, N audio video streams $F_1$, $F_2$, ..., $F_i$, ..., $F_j$, ..., $F_k$, ..., $F_N$ representing respectively the N users $U_1$, $U_2$, ..., $U_i$, ..., $U_j$, ..., $U_k$, ..., $U_N$ of these terminals.

At S106, the video conference management bridge PVC receives the N audio video streams $F_1$, $F_2$, ..., $F_i$, ..., $F_j$, ..., $F_k$, ..., $F_N$.

Figure 4A:
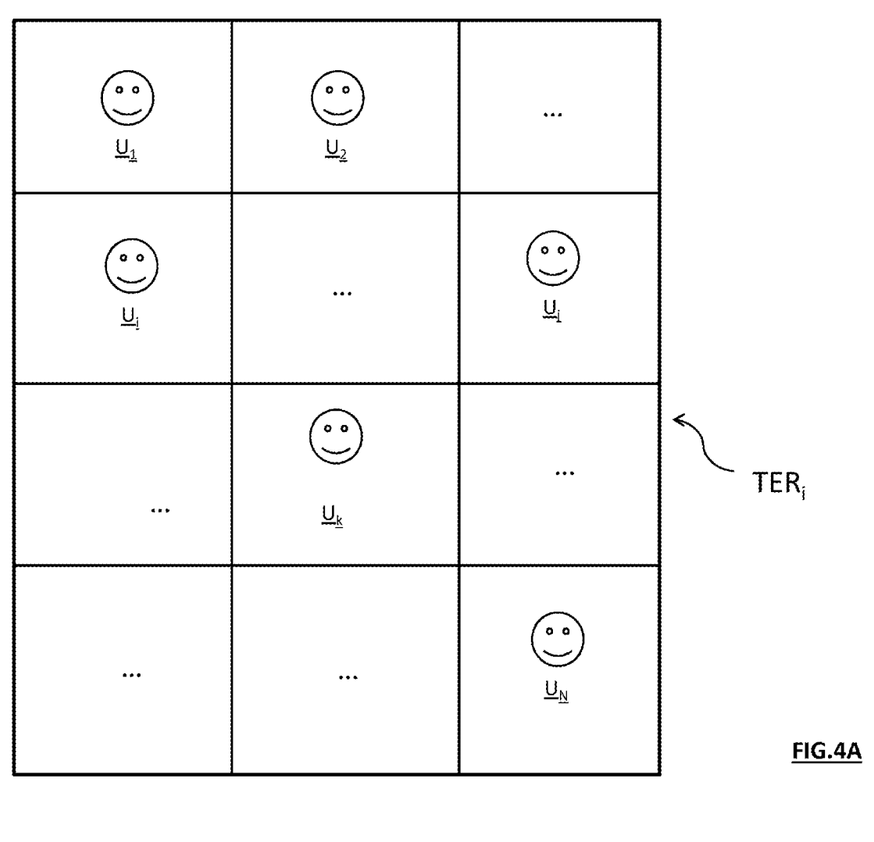
FIGS. 4A to 4C represent respectively three modes of display implemented in the method of communication by video conference of FIGS. 3A to 3C.

At S107, the video conference management bridge PVC generates a mosaic video VM1 containing the N audio video streams received at S106. As represented in FIG. 4A, the mosaic video VM1 is configured in such a way that, at the start of a video conference, the N audio video streams are displayed on the screen EC (FIG. 2) of a given communication terminal $TER_i$, in respectively N windows of equal size.

At S108, the video conference management bridge PVC transmits a message M3 to each of the N invited terminals, the message M3 containing the mosaic video VM1.

At S109, each of the N communication terminals receives the message M3.

At S110, the decoder DEC of each of the N communication terminals decodes the mosaic video VM1 contained in the received message M3.

At S111, the N audio video streams are displayed on the screen EC of each of the N terminals, respectively in N windows of equal size.

In accordance with the invention, during initialization S1, each of the N terminals undertakes, at S2, a downloading from the video conference management bridge PVC, of a procedure for detecting voice activity of each of the N users.

Such a downloading is transparent to the users $U_1$ to $U_N$. For a given communication terminal $TER_i$, the voice activity detection procedure is downloaded into the voice activity detection module DAC such as represented in FIG. 2.

The voice activity detection procedure is for example encapsulated in the invitation message M2 dispatched at S103 to each of the N terminals or else in the message M3 dispatched at S108. According to another embodiment, the voice activity detection procedure is downloaded automatically by each of the N terminals upon their connection S105 to the video conference management bridge PVC.

Once initialization S1 of the video conference and downloading S2 are terminated, in accordance with the invention and with reference to FIG. 3B, a detection of voice activity S3 of at the least one of the N users is implemented at a current instant, individually, in each of the N communication terminals participating in the video conference.

For a given communication terminal $TER_i$, the voice activity detection S3 progresses as follows at a current instant t.

At S300, the terminal $TER_i$ receives, from the video conference management bridge PCV, via the network RC, a message M4 which contains:
- an information item $IAV_1$ relating to the voice activity of the user $U_1$ in association with the identifier $ID_1$;
- an information item $IAV_2$ relating to the voice activity of the user $U_2$ in association with the identifier $ID_2$,
. . . ,
- an information item $IAV_i$ relating to the voice activity of the user $U_i$ in association with the identifier $ID_i$,
. . . ,
- an information item $IAV_j$ relating to the voice activity of the user $U_j$ in association with the identifier $ID_j$,
. . . ,
- an information item $IAV_k$ relating to the voice activity of the user $U_k$ in association with the identifier $ID_k$,
. . . ,
- an information item $IAV_N$ relating to the voice activity of the user $U_N$ in association with the identifier $ID_N$.

The information item $IAV_i$ of a given user $U_i$ takes a first value V1 representative of the presence of voice activity of this user or a second value V2 representative of the absence of voice activity of this user.

By way of example, V1=1 and V2=0.

According to one embodiment, such an information item is determined at the current instant by the video conference management bridge PVC, by analyzing the audio packets contained in the N audio video streams received respectively from the N terminals.

According to another embodiment, such an information item is determined individually at the current instant by each of the N communication terminals and then dispatched by each terminal to the video conference management bridge PVC which then concatenates each information item received in the message M4 in association with each corresponding identifier.

At S301, the module DAC (FIG. 2) of the terminal $TER_i$ extracts the first information item $IAV_1$ from the message M4 received and determines whether the first information item $IAV_1$ is at the first value V1 or at the second value V2, and then recommences these operations for the second information item $IAV_2$ and so on and so forth until the information item $IAV_N$.

If a single information item $IVA_j$ is at the value V1, the terminal $TER_i$ determines at S302 whether the information item $IVA_j$ has been at the value V1 since a predetermined instant $t_P$. The duration which separates the current instant t from the predetermined instant $t_P$ is for example defined in the voice activity detection procedure by a predetermined number K of time units of, for example, 500 ms each. According to an exemplary embodiment K=4.

If yes, the terminal $TER_i$ dispatches, at S303, to the video conference management bridge PVC, via the network RC, a message M5 requesting the audio video stream $F_j$ associated with the user $U_j$ who has been detected as speaking since the predetermined instant $t_P$, as main audio video stream to be displayed. The message M5 contains the identifier $ID_j$ of the user $U_j$.

In response to the message M5, the video conference management bridge PVC dispatches to the terminal $TER_i$, via the network RC, a message M6 containing the main audio video stream $F_j$.

At S304, the main audio video stream $F_j$ is received by the reception module REC (FIG. 2) of the terminal $TER_i$.

At S305, the main audio video stream $F_j$ is displayed on the screen EC of the terminal $TER_i$.

According to a preferred embodiment, only the main audio video stream $F_j$ is requested on completion of the determination operation S302.

Figure 4B:
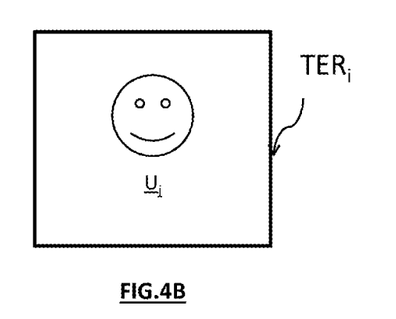

In the example represented in FIG. 4B, the audio video stream $F_j$ is then displayed in full screen on the screen EC of the terminal $TER_i$.

According to another embodiment, the terminal $TER_i$ furthermore dispatches, at S306, to the video conference management bridge PVC, via the network RC, a message M7 requesting the N−1 other audio video streams associated with the N−1 other users who have not been detected as speaking since the predetermined instant $t_P$, as respectively N−1 secondary audio video streams to be displayed. The message M7 contains the N−1 other identifiers associated respectively with the N−1 other users. As a variant of this other embodiment, the terminal $TER_i$ could dispense with requesting, as secondary audio video stream, the audio video stream relating to the user $U_i$, and this would make it possible to reduce the resources in terms of bandwidth of the communication network RC.

In response to the message M7, the video conference management bridge PVC dispatches to the terminal $TER_i$, via the network RC, a message M8 containing the N−1 secondary audio video streams.

At S307, the N−1 secondary audio video streams are received by the reception module REC (FIG. 2) of the terminal $TER_i$.

At S308, the N−1 secondary audio video streams are displayed on the screen EC of the terminal $TER_i$, in a less visible manner than the main audio video stream $F_j$.

The operations S306 to S308 are implemented simultaneously with the operations S303 to S305 or else subsequent to them.

Figure 4C:
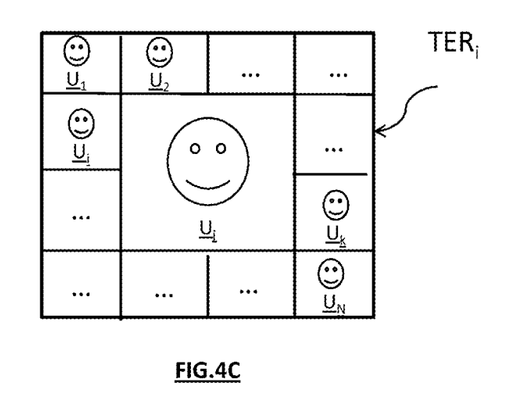

In the example represented in FIG. 4C, the main audio video stream $F_j$ is then displayed in a window disposed for example at the center of the screen EC of the terminal $TER_i$, the N−1 secondary audio video streams being displayed around this window, in windows of equal size but smaller than the center window.

According to a particular embodiment, the terminal $TER_i$ can dispense with requesting at S306 the N−1 secondary audio video streams. The message M5 dispatched at S303 could for example comprise an information item which indicates to the video conference management bridge PVC whether it returns to the terminal $TER_i$ only the main audio video stream $F_j$ or else the main audio video stream $F_j$ and the N−1 secondary audio video streams. Such an information item could be a bit set for example to 1 to request only the main audio video stream or to 0 to request the main audio video stream $F_j$ and the N−1 secondary audio video streams.

Figure 3C:
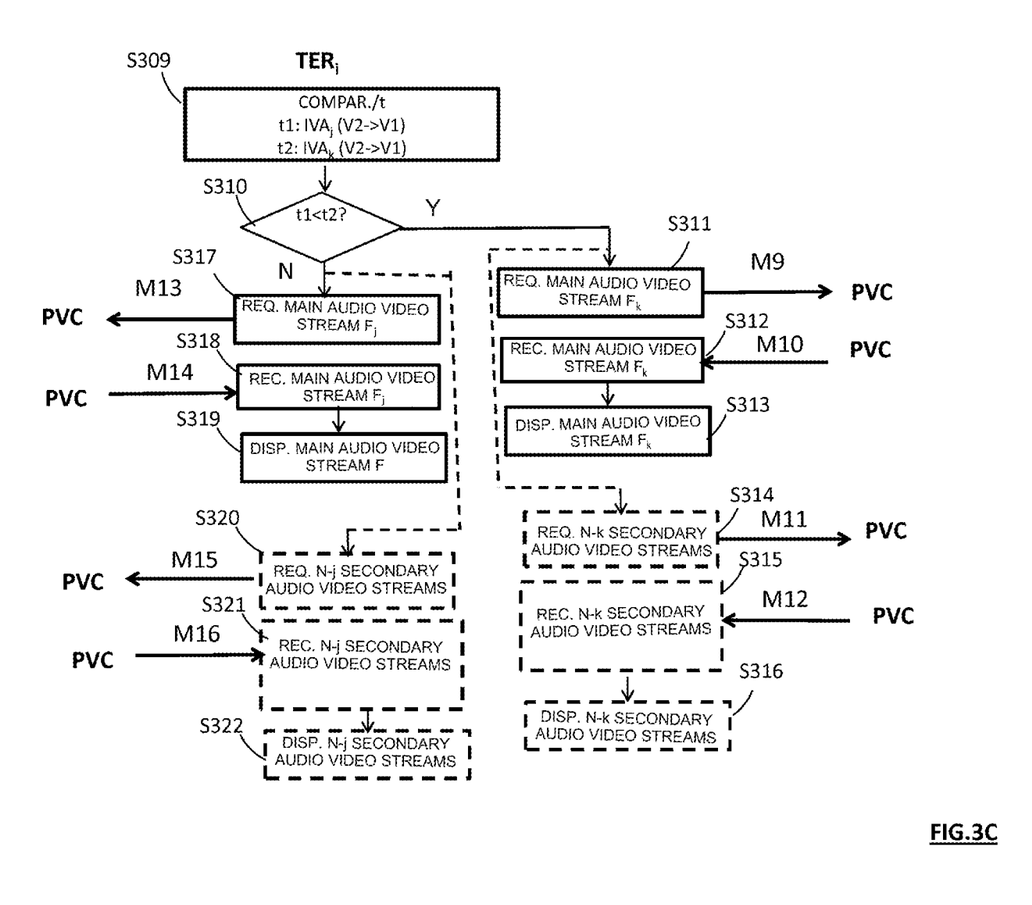

If on completion of the operation S301, at least two information items $IVA_j$ and $IVA_k$ are at the value V1, the terminal $TER_i$ implements the operations illustrated in FIG. 3C.

With reference to FIG. 3C, at S309, the module DAC of the terminal $TER_i$ compares the instant t1, preceding the current instant t, from which the information item $IVA_j$ passed from the second value V2 to the first value V1, with the instant t2 preceding the current instant t, from which the information item $IVA_k$ passed from the second value V2 to the first value V1.

At S310, the module DAC (FIG. 2) of the terminal $TER_i$ selects from among the instants t1 and t2, the one which is closer to the current instant t.

If the instant t2 is the one involved, the terminal $TER_i$ dispatches, at S311, to the video conference management bridge PVC, via the network RC, a message M9 requesting the audio video stream $F_k$ associated with the user $U_k$ who has been detected as speaking since the instant t2 closer to the current instant t, as main audio video stream to be displayed. The message M9 contains the identifier $ID_k$ of the user $U_k$.

In response to the message M9, the video conference management bridge PVC dispatches to the terminal $TER_i$, via the network RC, a message M10 containing the main audio video stream $F_k$.

At S312, the main audio video stream $F_k$ is received by the reception module REC (FIG. 2) of the terminal $TER_i$.

At S313, the main audio video stream $F_k$ is displayed on the screen EC of the terminal $TER_i$.

The audio video stream $F_k$ is for example displayed in full screen on the screen EC of the terminal $TER_i$, in the same way as in the example of FIG. 4B.

According to another embodiment, the terminal $TER_i$ furthermore dispatches, at S314, to the video conference management bridge PVC, via the network RC, a message M11 requesting the N−k other audio video streams associated with the N−k other users, as respectively N−k secondary audio video streams to be displayed. The message M11 contains the N−k other identifiers associated respectively with the N−k other users. As a variant of this other embodiment, the terminal TER$_i$ could dispense with requesting, as secondary audio video stream, the audio video stream relating to the user U$_j$, and this would make it possible to reduce the resources in terms of bandwidth of the communication network RC.

As explained above with reference to FIG. 3A, the operation S314 could furthermore be optional.

In response to the message M11, the video conference management bridge PVC dispatches to the terminal TER$_i$, via the network RC, a message M12 containing the N−k secondary audio video streams.

At S315, the N−k secondary audio video streams are received by the reception module REC (FIG. 2) of the terminal TER$_i$.

At S316, the N−k secondary audio video streams are displayed on the screen EC of the terminal TER$_i$, in a less visible manner than the main audio video stream F$_k$.

The operations S314 to S316 are implemented simultaneously with the operations S311 to S313 or else subsequent to them.

The N−k secondary audio video streams are for example displayed on the screen EC of the terminal TER$_i$, around the central window in which the main audio video stream F$_k$ is displayed, in the same way as in the example of FIG. 4C.

If on completion of the operation S301, the instant t1 is the one involved, the terminal TER$_i$ dispatches, at S317, to the video conference management bridge PVC, via the network RC, a message M13 requesting the audio video stream F$_j$ associated with the user U$_j$ who has been detected as speaking since the instant t1 closer to the current instant t, as main audio video stream to be displayed. The message M13 contains the identifier ID$_j$ of the user U$_j$.

In response to the message M13, the video conference management bridge PVC dispatches to the terminal TER$_i$, via the network RC, a message M14 containing the main audio video stream F$_j$.

At S318, the main audio video stream F$_j$ is received by the reception module REC (FIG. 2) of the terminal TER$_i$.

At S319, the main audio video stream F$_j$ is displayed on the screen EC of the terminal TER$_i$.

The audio video stream F$_j$ is for example displayed in full screen on the screen EC of the terminal TER$_i$, in the same way as in the example of FIG. 4B.

According to another embodiment, the terminal TER$_i$ furthermore dispatches, at S320, to the video conference management bridge PVC, via the network RC, a message M15 requesting the N−j other audio video streams associated with the N−j other users, as respectively N−j secondary audio video streams to be displayed. The message M15 contains the N−j other identifiers associated respectively with the N−j other users. As a variant of this other embodiment, the terminal TER$_i$ could dispense with requesting, as secondary audio video stream, the audio video stream relating to the user U$_j$, and this would make it possible to reduce the resources in terms of bandwidth of the communication network RC.

As explained above with reference to FIG. 3A, the operation S320 could furthermore be optional.

In response to the message M15, the video conference management bridge PVC dispatches to the terminal TER$_i$, via the network RC, a message M16 containing the N−j secondary audio video streams.

At S321, the N−j secondary audio video streams are received by the reception module REC (FIG. 2) of the terminal TER$_i$.

At S322, the N−j secondary audio video streams are displayed on the screen EC of the terminal TER$_i$, in a less visible manner than the main audio video stream F$_j$.

The operations S320 to S322 are implemented simultaneously with the operations S317 to S319 or else subsequent to them.

The N−j secondary audio video streams are for example displayed on the screen EC of the terminal TER$_i$, around the central window in which the main audio video stream F$_j$ is displayed, in the same way as in the example of FIG. 4C.

Again with reference to FIG. 3B, if at S301, the module DAC (FIG. 2) of the terminal TER$_i$ determines that none of the information items IAV$_1$, IAV$_2$, ..., IAV$_i$, ..., IAV$_N$ of the message M4 received have been at the first value V1 since the predetermined instant t$_P$, the module DAC determines at S323 whether the information items IAV$_1$, IAV$_2$, ..., IAV$_i$, ..., IAV$_N$ of the message M4 received have been at the second value V2 since the predetermined instant t$_P$.

If such is the case, the terminal TER$_i$ does not request any audio video stream to be displayed from the video conference management bridge PVC. In the case where a single audio video stream F$_j$ was displayed at the preceding instant t−1 on the screen EC of the terminal TER$_i$, at S324, the stream F$_j$ continues to be displayed in the same manner at the current instant t, as represented in FIG. 4B. In the case where at the instant t−1, the audio video stream F$_j$ was displayed as main stream, with the N−j secondary audio video streams displayed around the audio video stream F$_j$, as represented in FIG. 4C, these N audio video streams continue, at S324, to be displayed in the same manner at the current instant t.

If at S323, the module DAC of the terminal TER$_i$ determines that all the information items IAV$_1$, IAV$_2$, IAV$_i$, ..., IAV$_N$ of the message M4 received have not been at the second value V2 since the predetermined instant t$_P$, the voice activity detection method is ended and the terminal TER$_i$ places itself on standby awaiting receipt at the following instant t+1 of a new message, from the video conference management bridge PVC, which contains new voice activity information items IAV$_1$, IAV$_2$, ..., IAV$_i$, ..., IAV$_N$ relating respectively to the N users.

It goes without saying that the embodiments which have been described hereinabove have been given purely by way of wholly nonlimiting indication, and that numerous modifications can be easily introduced by the person skilled in the art without, however, departing from the scope of the invention.

The invention claimed is:

1. A method of communication by video conference between N communication terminals, such that N≥2, associated respectively with one of N users, the method implemented by a first communication terminal of the N terminals, the method comprising:

receiving, from a device for processing N audiovisual streams emitted respectively by one of the N terminals, N information items relating respectively to voice activity of one of the N users and associated respectively with one of N identifiers relating to the N corresponding users, each of the N information items taking a first value representative of the presence of voice activity or a second value representative of the absence of voice activity, for at least one of the N users, determining whether the received information item has or has not been at the same value for a first duration, and upon a determination that the received information item is at the first value;

requesting from the processing device, by using the user identifier corresponding to the at least one of the N users, an audiovisual stream associated with the at least one of the N users, as a main audiovisual stream to be displayed, receiving the requested main audiovisual stream, displaying the received audiovisual stream as the main audiovisual stream.

2. The method of claim 1, further comprising:

upon a determination that, for at least two first and second users from among the N users, the corresponding voice activity information item received has been at the first value for the first duration, comparing a time at which the information item received for the first user passed from the second value to the first value and the time at which the information item received for the second user passed from the second value to the first value, requesting from the processing device, as the main audiovisual stream to be displayed, an audiovisual stream associated with that of the first and second users for which the information item passed from the second value to the first value at the more recent time from among the two compared times, by using the corresponding user identifier, receiving the requested main audiovisual stream, displaying the received audiovisual stream received as the main audiovisual stream.

3. The method of claim 1, further comprising:

receiving, from the audio video stream processing device, N−1 audiovisual streams associated respectively with one of the N−1 remaining users, as N−1 secondary audiovisual streams to be displayed, displaying the N−1 secondary audiovisual streams simultaneously with the main audiovisual stream.

4. The method of claim 1, wherein only the main audiovisual stream is received and displayed by the first communication terminal.

5. The method of claim 1, wherein upon a determination that the information item received relating to the voice activity of each of the N users has been at the second value representative of the absence of voice activity, for a first duration, the main audiovisual stream displayed before the determination continues to be displayed.

6. A computer program stored on a non-transitory, computer-readable storage medium, the program comprising instructions which, when executed by a processor of a first communication terminal, cause the first communication terminal to implement the method of claim 1.

7. A non-transitory, computer-readable storage medium having stored thereon instructions which, when executed by a processor by a first communication terminal of N communication terminals, such that N≥2, cause the processor to implement a method of communication by video conference between the N communication terminals, associated respectively with one of N users, the method comprising:

receiving, from a device for processing N audiovisual streams emitted respectively by one of the N terminals, N information items relating respectively to voice activity of one of the N users and associated respectively with one of N identifers relating to the N corresponding users, each of the N information items taking a first value representative of the presence of voice activity or a second value representative of the absence of voice activity, for at least one of the N users, determining whether the received information item has or has not been at the same value for a first duration, and upon a determination that the received information item is at the first value;

requesting from the processing device, by using the user identifer corresponding to the at least one of the N users, an audiovisual stream associated with the at least one of the N users, as a main audiovisual stream to be displayed, receiving the requested main audiovisual stream, displaying the receiving audiovisual stream as the main audiovisual stream.

8. A communication terminal configured to communicate by video conference with at least one other communication terminal, the communication terminal and the other communication terminal belonging to a set of N communication terminals, such that N≥2, associated respectively with one of N users, the terminal comprising a processor and a memory, the terminal configured to:

receive, from a device for processing N audiovisual streams emitted respectively by one of the N terminals, N information items relating respectively to voice activity of one of the N users and associated respectively with one of N identifiers relating to the N corresponding users, each of the N information items taking a first value representative of the presence of voice activity or a second value representative of the absence of voice activity, for at least one of the N users, determine whether the received information item has or has not been at the same value for a first duration, upon a determination that the received information item is at the first value:

request from the processing device, by using the user identifier corresponding to the at least one of the N users, an audiovisual stream associated with the at least one of the N users, as a main audiovisual stream to be displayed, receive the requested main audiovisual stream, display the received audiovisual stream as the main audiovisual stream.

9. The communication terminal of claim 8, wherein the terminal is further configured to:

upon a determination that, for at least two first and second users from among the N users, the corresponding voice activity information item received has been at the first value for the first duration compare the time at which the information item received for the first user passed from the second value to the first value and the time at which the information item received for the second user passed from the second value to the first value, request from the processing device, as the main audiovisual stream to be displayed, an audiovisual stream associated with that of the first and second users for which the information item passed from the second value to the first value at the more recent time from among the two compared times, by using the corresponding user identifier, receive the requested main audiovisual stream, display the received audiovisual stream as the main audiovisual stream.

10. The communication terminal of claim 8, wherein the terminal is further configured to:

receive, from the audiovisual stream processing device, N−1 audiovisual streams associated respectively with one of the N−1 remaining users, as N−1 secondary audiovisual streams to be displayed, and display the N−1 secondary audiovisual streams simultaneously with the main audiovisual stream.

11. The communication terminal of claim 8, wherein only the main audio video stream is received and displayed.

12. The communication terminal of claim 8, wherein upon a determination that the information item received relating to the voice activity of each of the N users has been at the second value representative of the absence of voice activity, for a first duration, the main audiovisual stream displayed before the determination continues to be displayed.

\* \* \* \* \*